United States Patent Office 3,185,633
Patented May 25, 1965

3,185,633
STARCH CONVERSION
Josef Krebs, Darmstadt, Germany, assignor to Rohm & Haas G.m.b.H., Darmstadt, Germany
No Drawing. Filed Mar. 2, 1961, Ser. No. 92,748
Claims priority, application Germany, Mar. 3, 1960, R 27,469
5 Claims. (Cl. 195—17)

This invention relates to a method of converting starch to a syrup containing sugars and dextrin by enzymatic action.

Starch syrup containing dextrin and sugars is conventionally made by hydrolysis of starch with dilute sulfuric acid or hydrochloric acid. Thus, 30 kilograms of starch stirred into 70 kilograms of water can be converted by warming in the presence of 0.1 to 0.2 kg. of concentrated hydrochloric acid. Thereafter, free acid is neutralized with sodium bicarbonate and the solution is concentrated in vacuum until it contains a solids content of about 85 percent. In such a manner, for example can be prepared a syrup comprising about 40 percent glucose, 45 percent dextrin, and 15 percent water, and having an ash residue of about 0.3 percent.

Although numerous variations of this process are known, particularly with respect to the apparatus employed in carrying out the process, e.g., as a continuous process, the enormous quantities of starch syrup annually produced throughout the world are for the most part obtained by acid hydrolysis of starch.

However, it is known in the prior art that starch can be converted to sugars by enzymes. This mode of operation is employed industrially, for example, in distilleries for the conversion of potato or grain mashes, and in the brewing arts for the preparation of malt liquor. However, enzymatic conversion heretofore has been of no significant practical importance for the preparation of starch syrups, primarily for the reason that, according to current opinion, starch can enzymatically be converted to dextrin and/or glucose only when in a gelatinized condition. To accomplish this, starch must first be suspended in cold or warm water, heated to the gelatinization temperature, and then again cooled before addition of enzyme thereto. Since gelatinized starch, even in relatively low concentrations, forms thick pastes, the stirring of such a mass, for example in mixing the enzyme therewith, is made extremely difficult or impossible. If one attempts to overcome these difficulties by converting solutions containing relatively small concentrations of starch, an expensive concentration of the resulting syrup solution in vacuum is required as an adjunct to the process.

It has already been proposed in copending U.S. application Ser. No. 58,172, now U.S. Patent 3,029,192, granted April 10, 1962, that dextrin be prepared by enzymatic conversion of starch by introducing into water, with stirring and at a temperature above the gelatinization temperature of the starch, a mixture of starch and a starch converting enzyme. The gelatinization temperature differs according to the kind of starch employed. For example, potato starch gelatinizes between 58° and 62° C., wheat starch between 65° and 68° C., corn starch between 55° and 62° C., and rice starch between 54° and 62° C. As in the present invention, a quick and complete gelatinization of the starch can be attained by addition of the mixture to water having a temperature at least 10 to 15° C. higher than the aforementioned gelatinization temperatures. In the prior art process, the starch is converted in a short period without gelatinization of the starch-enzyme mixture. In this fashion, it is possible to produce, in one production step, products having a solids content of about 75 percent, for example. In the prior art process already proposed, such a temperature is maintained throughout the process, or is reached at the end of the process, that the enzyme present is thermally inactivated and further conversion of the dextrin formed does not occur, or takes place only to a negligible extent.

It has now been found that a highly concentrated starch syrup containing dextrin and sugars can be prepared directly from starch if the above-described prior art process is so modified that a mixture of starch and an amylase-containing enzyme preparation is introduced with stirring into water whose temperature lies above the gelatinization temperature of the starch, but with avoidance of temperatures at which a complete inactivation of the enzyme takes place, and/or with such amylase concentrations as will convert the starch to sugars. In the process, the amylase concentration is so chosen that the starch, for the most part, is converted beyond the dextrin stage into reducing carbohydrates such as sugars.

Most simply, a mixture of starch and amylase are introduced, with stirring, into water heated to about 70°–80° C. whereby dextrin is rapidly formed and a homogeneous starch-dextrin-water mixture having a solids content from about 50 or 60 to 80 percent by weight can be prepared.

Those skilled in the art will recognize that gelatinized starch in the absence of dextrin forms a stiff mass even in concentrations as low as about 10 percent. In the process described above, however, the fermentative conversion of starch to dextrin and the conversion of dextrin to sugars takes place concurrently from the moment that the starch-amylase mixture is introduced into the water heated above the gelatinization temperature of starch.

The process described above can also be suitably modified as follows. For example, starch may be converted to dextrin by introduction of a starch-amylase mixture into water at about 90°–95° C. The temperature of the mixture is then lowered into a temperature region in which the enzyme is optimally effective, for example from about 30° or 40° to about 60° C. Conversion to sugar is then permitted to proceed to the degree desired, with addition of a further quantity of amylase, if appropriate.

It is also possible to introduce the total amount of amylase to be employed, together with a portion of the starch to be converted, into water at for example about 90° to 95° C., and to introduce thereinto the principal portion of the starch. According to this method, gelatinization and conversion of the first starch portion take place extremely rapidly, whereby the conversion products of the starch substantially protect the enzyme against thermal inactivation. The decomposition of the starch introduced in the second method step then follows as described earlier.

Finally, it is also possible first to prepare a solution of amylase in water, heated for example to about 90° C., and directly thereafter to stir starch thereinto. This process has the advantage that the mixing of the starch with amylase can be avoided, but requires an increased amount of enzyme. In the method just described, enzymes having a relatively high resistance to temperature, such as bacterial amylase, are used. Also, by the joint use of stabilizing agents known to the art, for example calcium salts, the thermal inactivation of the enzyme can be kept low.

The amounts of amylase used are so chosen that they are sufficient to bring about the degree of conversion to sugar desired.

The temperature at which the major part of the dextrin is converted to sugar should suitably lie below that temperature at which the amylase is completely inactivated. This differs for the type of enzyme employed, and is, for example, about 60° C. for fungus amylases and about 85° C. for bacterial amylases. If a rapid conversion of the starch to dextrin and sugar is desired, a relatively high temperature can be used; however, correspondingly larger amounts of enzyme must then be employed.

The preparation of a commercial starch syrup is the goal of the process described above and shown in the examples below. It is also possible, of course, to increase the degree of enzymatic conversion to obtain a sugar content of from 40 percent to 45 percent, that is to produce products poor in dextrin. However, a complete conversion to sugar is not possible, since, in a closed system, an equilibrium point will always be reached in the enzymatic conversion of starch to sugar or in the enzymatic conversion of dextrin to sugar. Complete conversion to sugar can be brought about by a subsequent acid hydrolysis, if desired.

A syrup having a sugar and dextrin content totaling 70 to 80 percent can be prepared in a simple manner according to the present invention, without the neutralization and vacuum concentration steps which are mandatory in the acid hydrolysis process previously employed. The resulting product is suitable for human consumption without further working, purification, or the like. The syrup is also suited as a starting material for further microbiological transformation, for example, fermentation.

A better understanding of the invention and of its many advantages can be had by referring to the following specific examples, given by way of illustration.

*Example 1*

950 grams of potato starch were mixed with 5 grams of a bacterial amylase concentrate having an efficiency of about 15,000 units according to Wohlgemuth, and were then continuously introduced into 545 cc. of water at a temperature between 88°–92° C. with thorough stirring. After cooling to 45° C., 2 grams of malt amylase were introduced with stirring, and the mass was permitted to stand until the desired degree of sugar formation had taken place. The malt amylase added had a strength of 8.6 units/gram measured at pH 5, according to Willstätter. Of the water present, about 190 centimeters were lost by evaporation, so that a concentration of about 72 percent was reached. By the addition of alpha-glucosidases, if not already present in the amylase preparation, the production of glucose can be promoted.

*Example 2*

500 grams of potato starch were mixed with 2.38 grams of an amylase obtained by extraction and salt precipitation from a culture of *Aspergillus oryzae*. The preparation had a strength of about 23 amylase units per gram, according to Willstätter. The resulting mixture was stirred into 290 cc. of water at a temperature of 73° to 75° C. over a period of about ten minutes. This temperature was maintained for about 20 minutes, then lowered to 50° C. and maintained at this temperature, or at still lower temperatures, until the desired degree of sugar formation had been reached.

Although specific embodiments have been herein shown and described, it will be understood that they are illustrative and are not to be construed as limiting the scope and spirit of the invention.

What is claimed is:

1. A process for the preparation of converted starch syrup containing dextrin and sugars, the solids content of said syrup being at least 50 percent by weight, which process comprises stirring a mixture of starch and an amylase into water heated to a temperature above the gelatinization temperature of the starch but below a temperature at which substantial amounts of the amylase are inactivated, then lowering the temperature of the resulting mixture into a temperature region in which said amylase is optimally effective and maintaining the mixture in said temperature region until the desired degree of starch conversion is obtained.

2. A process as in claim 1 wherein additional amounts of amylase are added to said mixture after the temperature of the mixture has been lowered into said temperature region.

3. A process for the preparation of converted starch syrup containing dextrin and sugars, the solids content of said syrup being at least 50 percent by weight, which process comprises stirring a mixture of starch and an amylase into water heated to about 70°–95° C., above the gelatinization temperature of the starch but below a temperature at which substantial amounts of the amylase are inactivated, then lowering the temperature of the resulting mixture into the temperature region between about 30° C. and 60° C. and maintaining the mixture in said temperature region until the desired degree of starch conversion is obtained.

4. A process as in claim 3 wherein additional amounts of amylase are added to said mixture at a temperature between about 30° C. and 60° C.

5. A process as in claim 3 wherein complete conversion of starch to sugars is effected by subsequent acid hydrolysis of said syrup.

References Cited by the Examiner

UNITED STATES PATENTS

| 1,677,614 | 7/28 | Boidin et al. | 195—17 |
|---|---|---|---|
| 1,677,614 | 7/28 | Boidin et al. | 127—38 X |
| 2,203,324 | 6/40 | Copland | 127—38 |
| 2,258,741 | 10/41 | Champion et al. | 127—38 |
| 2,951,762 | 9/60 | Nugey | 195—14 |
| 3,029,192 | 4/62 | Krebs | 195—17 |

FOREIGN PATENTS

| 122,405 | 12/19 | Great Britain. |
|---|---|---|
| 528,258 | 10/40 | Great Britain. |
| 579,702 | 8/46 | Great Britain. |

MORRIS O. WOLK, *Primary Examiner.*

FRANK CACCIAPAGLIA, JR., *Examiner.*